(12) United States Patent
Kharche et al.

(10) Patent No.: US 12,715,343 B2
(45) Date of Patent: Aug. 25, 2026

(54) VEHICLE SEAT LONGITUDINAL ADJUSTMENT ASSEMBLY

(71) Applicant: Brose Fahrzeugteile SE & Co. Kommanditgesellschaft, Coburg, Coburg (DE)

(72) Inventors: Dhiraj Kharche, Auburn Hills, MI (US); Ronald Kujawa, Sterling Heights, MI (US); Leo Ioppolo, Washington, MI (US); Sean Sabo, West Bloomfield, MI (US)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 323 days.

(21) Appl. No.: 18/431,196

(22) Filed: Feb. 2, 2024

(65) Prior Publication Data

US 2025/0249801 A1 Aug. 7, 2025

(51) Int. Cl.
*B60N 2/12* (2006.01)
*B60N 2/20* (2006.01)

(52) U.S. Cl.
CPC ................. *B60N 2/12* (2013.01); *B60N 2/20* (2013.01)

(58) Field of Classification Search
CPC .................................... B60N 2/12; B60N 2/20
USPC ........................................................ 297/344.1
See application file for complete search history.

(56) References Cited

U.S. PATENT DOCUMENTS 4,881,774 A * 11/1989 Bradley ................. B60N 2/123 297/341
5,829,728 A * 11/1998 Hoshihara ............ B60N 2/0715 296/68.1
6,098,946 A * 8/2000 Sechet ................. B60N 2/0715 297/341
6,572,066 B1 * 6/2003 Paisley ................ B60N 2/0715 296/65.13
6,616,233 B1 * 9/2003 Debus .................... B60N 2/123 297/341
6,641,104 B2 * 11/2003 Flick .................... B60N 2/0875 297/344.1

(Continued)

FOREIGN PATENT DOCUMENTS

DE 10127153 A1 * 11/2002 ............. B60N 2/123
DE 20313952 U1 1/2005
WO WO-2012071659 A1 * 6/2012 ............... B60N 2/08

*Primary Examiner* — Jose V Chen
(74) *Attorney, Agent, or Firm* — Dickinson Wright PLLC

(57) ABSTRACT

A release assembly for use in a vehicle seat including a pair of rail assemblies provided with a fixed rail, a translatable rail, and a locking device. The locking device configured to selectively lock the translatable rail to the fixed rail and unlock the translatable rail from the fixed rail. The release assembly including a mounting bracket provided with retention features and defining a mounting aperture. The release assembly further including an actuation assembly and a bushing. In an installed state, the actuation assembly is configured to rotate relative to the mounting bracket to actuate a locking lever of the locking device to unlock the translatable rail. The bushing fixed to the actuation assembly and configured to be inserted into the mounting aperture and, in the installed state, retained within the mounting aperture by a snap-fit condition formed between the bushing and the one or more retention features.

19 Claims, 12 Drawing Sheets

(56) References Cited

U.S. PATENT DOCUMENTS 6,902,235 B2 * 6/2005 Rohee .................... B60N 2/085 297/341
8,136,784 B2 * 3/2012 Yamada ............... B60N 2/0887 248/424
8,322,677 B2 * 12/2012 Nonomiya ........... B60N 2/0715 297/344.1
8,469,328 B2 * 6/2013 Nakamura ........... B60N 2/0705 248/424
8,616,515 B2 * 12/2013 Hayashi ............... B60N 2/0887 296/65.13
8,714,509 B2 * 5/2014 Hayashi ............... B60N 2/0818 296/65.13
8,757,577 B2 * 6/2014 Naoki .................. B60N 2/0887 297/344.1
8,967,583 B2 * 3/2015 Stoia .................... B60N 2/0887 296/65.13
9,010,712 B2 * 4/2015 Gray ........................ B60N 2/12 248/424
10,940,774 B2 3/2021 Kujawa et al.
2003/0209930 A1 * 11/2003 Horsfield ............. B60N 2/0705 297/344.1
2009/0322136 A1 * 12/2009 Kazyak ................ B60N 2/0875 297/344.1
2010/0308618 A1 * 12/2010 Holzhueter .......... B60N 2/3011 296/65.05
2011/0193389 A1 * 8/2011 Wojatzki .............. B60N 2/0705 297/344.1
2012/0032058 A1 * 2/2012 Nihonmatsu ............ B60N 2/06 248/429
2013/0278033 A1 * 10/2013 Tame ................... B60N 2/0722 297/344.1
2014/0042789 A1 * 2/2014 Kitaguchi .............. B60N 2/067 297/344.1
2014/0375095 A1 * 12/2014 Schumann ............. B60N 2/123 297/344.1
2015/0314707 A1 * 11/2015 Couasnon .............. B60N 2/085 297/344.1
2016/0114703 A1 * 4/2016 Fujita ................... B60N 2/1615 248/550
2017/0240067 A1 * 8/2017 Stutika ................. B60N 2/0732
2018/0037140 A1 * 2/2018 Gollhardt ............. B60N 2/0252
2022/0227261 A1 * 7/2022 Ferenc ................. B60N 2/0732
2023/0049867 A1 * 2/2023 Jung ........................ B60N 2/12
2024/0294100 A1 * 9/2024 Kim ..................... B60N 2/3031

* cited by examiner 170, 170a
140
150
154, 162
128
156, 162
152

170, 170a
150
154, 162
128
152
156, 162

170, 170a
150
154, 162
128
152
156, 162

170, 170b
154, 162
128

170, 170b
D1
D1
128

170, 170b
154, 162
D2
D2
156, 162
152
128

VEHICLE SEAT LONGITUDINAL ADJUSTMENT ASSEMBLY

TECHNICAL FIELD

The present disclosure relates to vehicle seats, including vehicle seats provided with a manual longitudinal adjustment assembly and a release assembly for the same.

BACKGROUND

A vehicle seat with a release assembly is described in German Utility Patent DE 203 13 952 U1.

SUMMARY

According to one embodiment, a vehicle seat is provided. The vehicle seat may include a first rail assembly, a second rail assembly, at least one locking device, and an actuation assembly. The first rail assembly may include a first fixed rail and a first translatable rail, and the second rail assembly may include a second fixed rail and a second translatable rail. The at least one locking device may be coupled to at least one of the first rail assembly and the second rail assembly. The at least one unlocking device includes a locking lever configured to selectively change between a locked state, in which the at least one unlocking device locks at least one of the first translatable rail and the second translatable rail to the first fixed rail and the second fixed rail, respectively, and an unlocked state in which the at least one locking device permits the at least one of the first translatable rail and the second translatable rail to translate in a longitudinal direction along the at least one first fixed rail and the second fixed rail, respectively. The actuation assembly may be configured to rotate to actuate the locking lever to change the at least one locking device from the locked state to the unlocked state. The actuation assembly may be configured to be fixed to the first and second rail assemblies by inserting the actuation assembly in a direction parallel to the longitudinal direction and between the first rail assembly and the second rail assembly.

According to another embodiment, a release assembly for use in a vehicle seat is provided. The vehicle seat may include a pair of rail assemblies. Each of the rail assemblies may include a fixed rail, a translatable rail, and a locking device. The locking device may be configured to selectively lock the translatable rail to the fixed rail and unlock the translatable rail from the fixed rail to permit translation of the translatable rail along the fixed rail. The release lever assembly may include a mounting bracket, an actuation assembly, and a bushing. The mounting bracket may be configured to be fixed to a rail assembly of the pair of rail assemblies and the mounting bracket may include one or more retention features and may define a mounting aperture in an installed state, the actuation assembly may be configured to rotate with respect to the mounting bracket to actuate a locking lever of the locking device to unlock the translatable rail from the fixed rail. The bushing may be fixed to the actuation assembly and, as an example, the bushing may be configured to be inserted into the mounting aperture, and in the installed state, retained within the mounting aperture by a snap-fit condition formed between the bushing and at least some of the one or more retention features.

According to yet another embodiment, a method of assembling a release lever assembly for use in a vehicle seat is provided. The vehicle seat may include a pair of rail assemblies and each rail assembly of the pair of rail assemblies includes a fixed rail, a translatable rail, and a locking device. The locking device may be configured to selectively lock the translatable rail to the fixed rail and unlock the translatable rail from the fixed rail to permit translation of the translatable rail along the fixed rail. The method may include fixing the bushing to an actuation assembly. The actuation assembly may include a handle, an actuation lever, and a transverse member. The transverse member may be fixed to the handle and the actuation lever. The bushing may include a barrel and the fixing step may include inserting an end portion of the transverse member into the barrel of the bushing. The method may also include inserting the actuation assembly and the bushing between each rail assembly of the pair of rail assemblies and in a direction substantially parallel to the longitudinal direction. The method may further include attaching the bushing to a mounting bracket. The mounting bracket may include a first portion and a second portion, the first portion may be fixed to the translatable rail and the second portion may be disposed between each rail assembly of the pair of rail assemblies.

DETAILED DESCRIPTION

Figure 1:
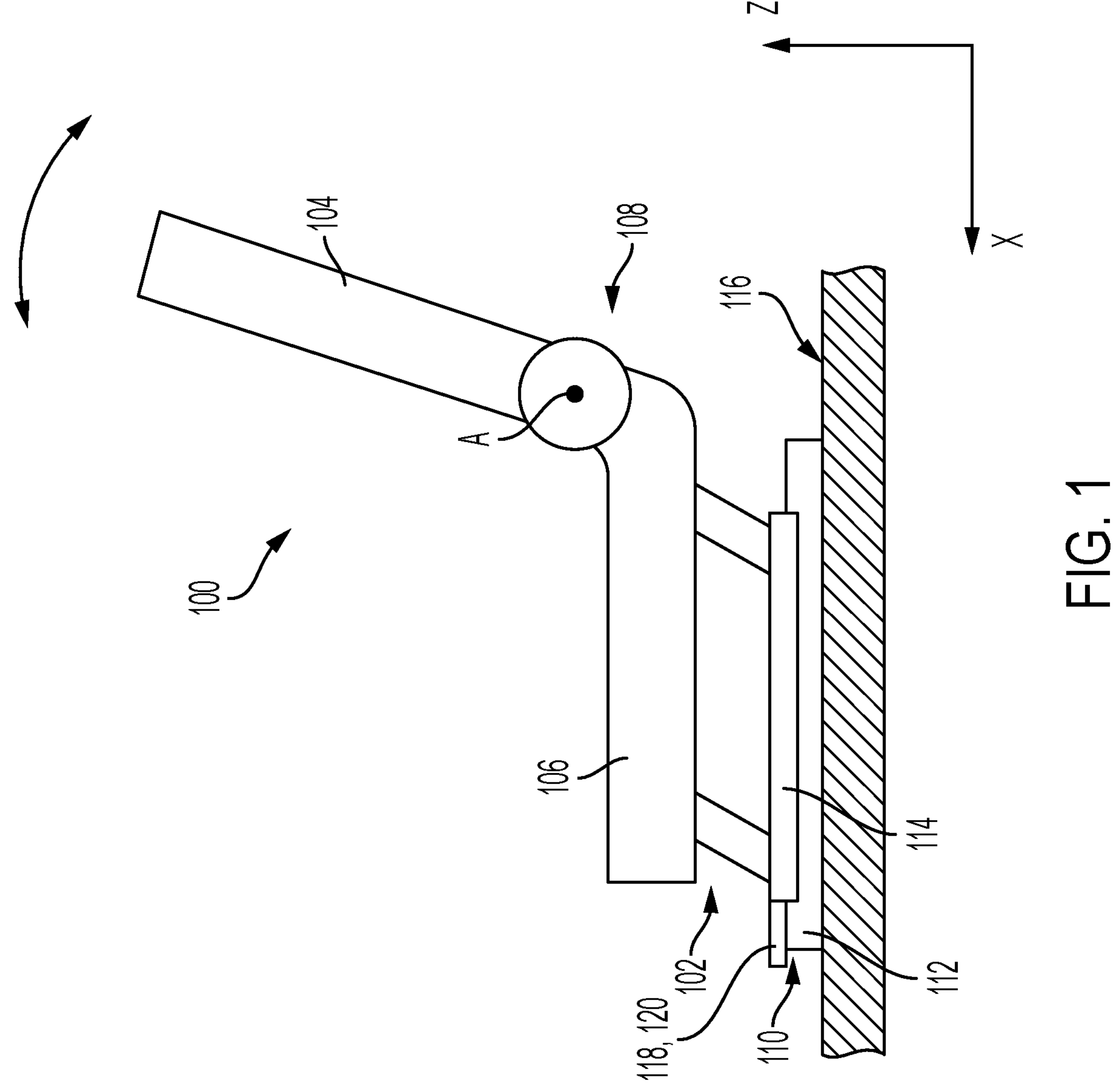
FIG. 1 illustrates a schematic drawing of an exemplary vehicle seat

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within +0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Vehicle seats, in particular those vehicle seats that are manually adjustable to change the longitudinal position (e.g., in the fore-aft direction) of the seat include a release assembly that may be actuated to unlock the translatable rails from the fixed rails so that the user may slide the vehicle seat in the forward and rearward directions. Generally, the manufacturer of the vehicle seat may assemble the rail assemblies as separate components and marry the rail assemblies to one another by attaching the release assembly and one or more other assemblies, such as an upper frame assembly or cushion portion to form a seat sub-assembly or the complete seat. The manufacturer will then supply the seat sub-assembly or complete seat to an original equipment manufacturer (OEM) or a higher tier manufacturer. The OEM will then incorporate the complete seat into the desired motor vehicle.

Under certain circumstances, the OEM or higher tier manufacturer may desire to assemble portions of the seat in their own facility prior to incorporating the seat into vehicles. As an example, the OEM may require the seat manufacturer to ship the rail assemblies and the release assembly as separate components and the OEM may then assemble the release assembly to the rail assemblies prior to incorporating the vehicle seat into the vehicle. Typically, assembling the release assembly to the rail assemblies requires placing the rail assemblies on floating fixtures and positioning the release assembly between each rail assembly and sliding the rail assemblies towards the release assembly to fix the release assembly to the each of the rail assemblies. In short, this requires placing each rail assembly, placing the release assembly, positioning each of the rail assemblies onto the release assembly, and fixing the release assembly to each of the rail assemblies. This process has been found to be relatively complicated and time consuming.

The disclosure provided herein attempts to address the above-mentioned shortcomings.

FIG. 1 illustrates a schematic illustration of an exemplary vehicle seat 100 provided with a cushion portion 102 and a backrest 104. A fitting or recliner 108 may connect the backrest 104 to one or more portions of the cushion portion 102 such as a seat cushion 106. The recliner 108 may be configured to rotate about an axis A to adjust the inclination of the backrest 104 as represented by the bi-directional arrow disposed above the backrest 104. The cushion portion 102 may include one or more (e.g., two) rail assemblies 110 that may be fixed to a vehicle floor 116.

The rail assemblies 110 may each include a fixed rail 112 and a translatable rail 114 that may be configured to translate along the fixed rail 112 to adjust the cushion portion 102 and backrest 104 in a longitudinal direction as represented by the x-axis. The cushion portion 102 may include an actuation assembly 118 and release assembly 120 and at least one of the rail assemblies 110 may include a locking device 132 (FIG. 3) that may be actuated in response to a force applied to the release assembly 120 in one or more directions (e.g., vertical direction, as represented by the z-axis).

Figure 2:
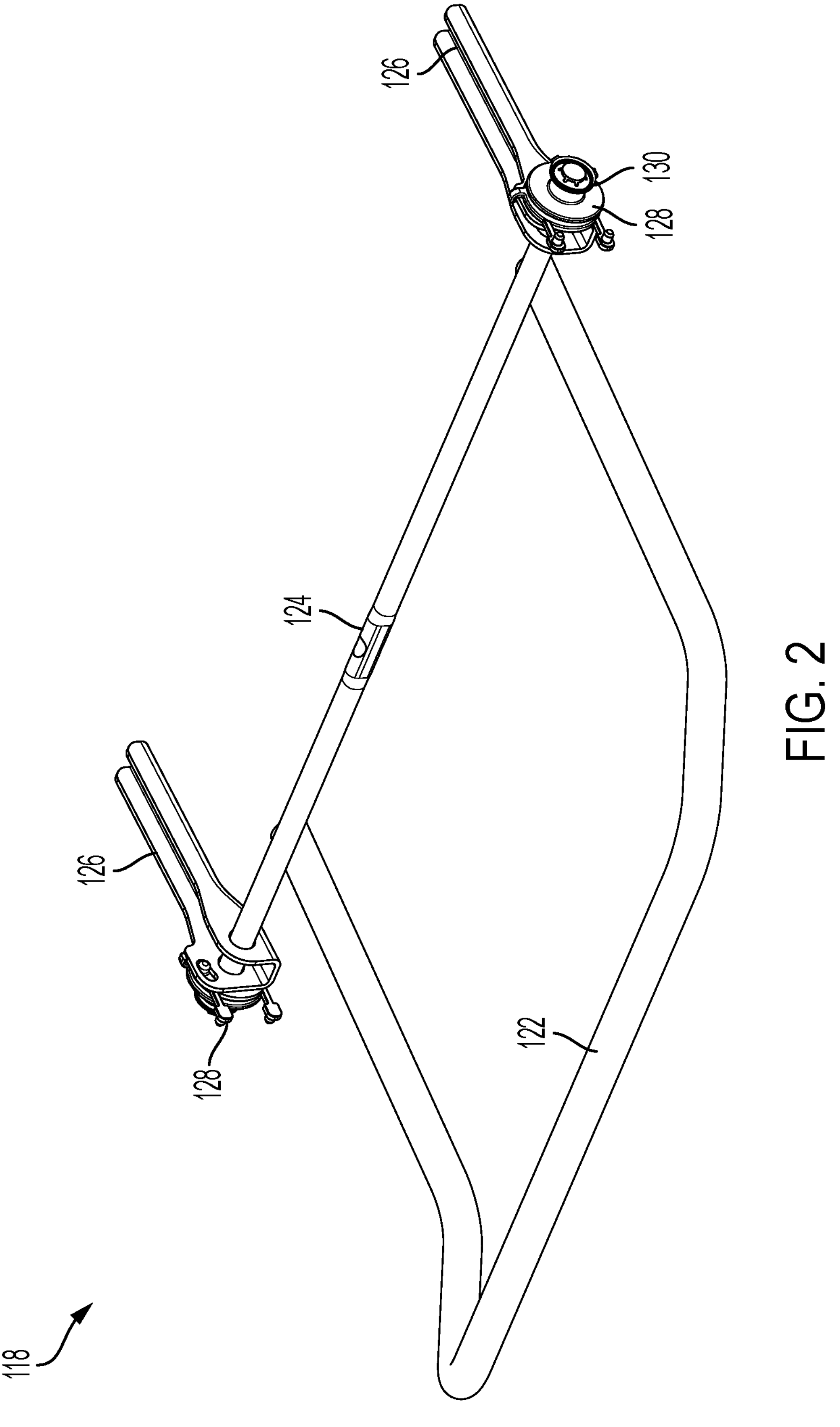
FIG. 2 illustrates a perspective view of an exemplary actuation assembly of the vehicle seat shown in FIG. 1.
Figure 3:
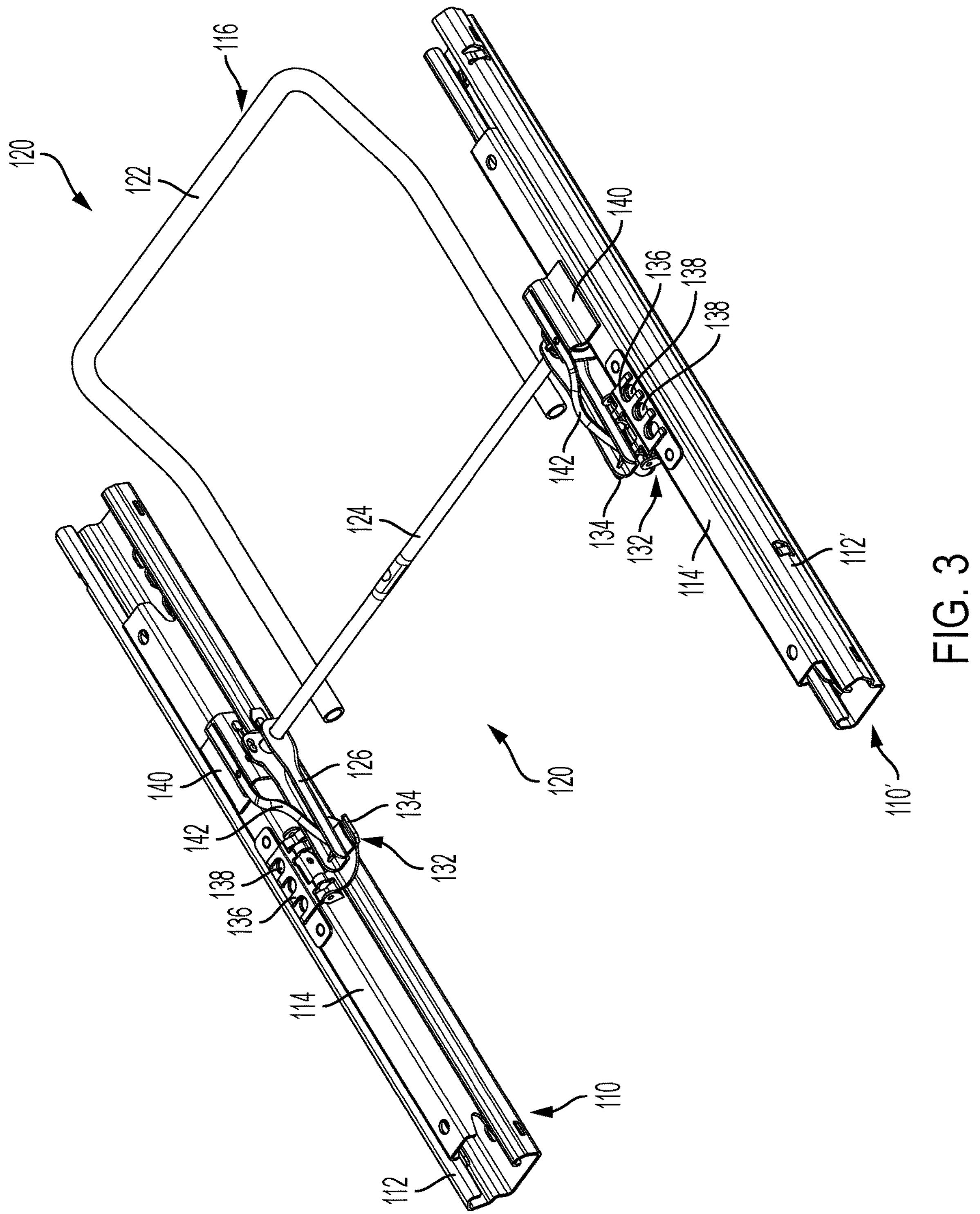
FIG. 3 illustrates a partial perspective view of the actuation assembly fixed to a cushion portion of the vehicle seat shown in FIG. 1.

FIG. 2 illustrates a perspective view of the actuation assembly 118 and FIG. 3 illustrates a perspective view of the actuation assembly 118 assembled to the pair of rail assemblies 110, 110' to form the release assembly 120. For purposes of clarity, the rail assemblies 110 are depicted without brackets generally provided on the fixed rails 112 and translatable rails 114 and reference numeral 110 generally refers to both rail assemblies as well as the left-hand rail assembly 110. Reference numeral 110' refers to the right-hand rail assembly 110'. As will be described in greater detail below, the actuation assembly 118 may be configured as a modular unit or sub-assembly that may be shipped to a higher tier manufacturer or OEM so that the higher tier manufacturer or OEM may assemble the actuation assembly 118 to the rail assemblies 110 in a relatively easy and cost-efficient manner.

The actuation assembly 118 may include a handle 122, a transverse member 124, and one or more release levers or actuation levers 126. The transverse member 124 may be formed by a metal tube or other cylindrical shaped member that may be fixed (e.g., welded) to the handle 122 and each of the actuation levers 126. Note, one or more of the handle 122, release levers 126, and transverse member 124 may be integrally formed or connected to one another as opposed to being separate components as depicted in FIG. 2. The actuation assembly 118 may also include one or more bushings 128 and clips 130 that may be fixed or directly connected to end portions of the transverse member 124. Note, in one or more embodiments, the clip 130 may be a retaining ring or another suitable fastener as required.

One or more of the rail assemblies 110 may include a mounting bracket 140 that may be configured to receive and fix portions of the actuation assembly 118 to the rail assemblies 110. In one or more embodiments, the mounting bracket 140 may be fixed to a portion of each of the translatable rails 114, 114' such as to a top wall or surface of each translatable rail 114, 114'. Each of the rail assemblies 110, 110' may include a locking device 132 that may be positioned rearward of the mounting bracket 140. An exemplary locking device is disclosed in German Utility Patent DE 203 13 952 U1 which is hereby incorporated by reference.

The locking device 132 may include one or more (e.g., three) pins 138 that may extend through the top wall of the translatable rail 114 and engage holes or slots formed in the fixed rail when the locking device 132 is in the locked state. The locking device 132 may include or more levers such as a locking lever 134 and a pin lever 136 that may cooperate with one another to move (e.g., raise) the pins 138 so that the pins 138 disengage from the fixed rail 112, 112' and change the state of the locking device 132 from the locked state to the unlocked state to permit the translatable rails 114, 114' to translate along the fixed rails 112, 112'. When the actuation assembly 118 is in the installed position, the actuation lever 126 may engage or lie along a portion of the locking lever 134.

Figure 11:
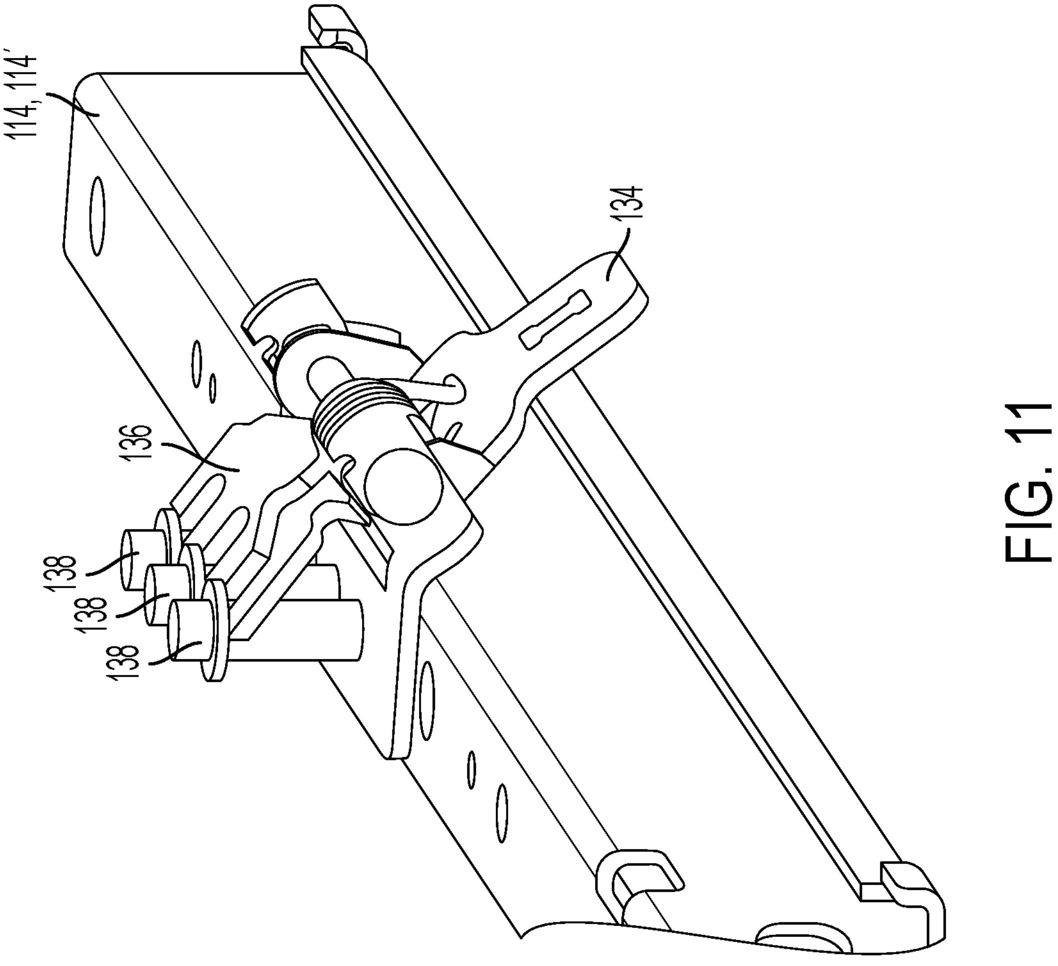
FIG. 11 illustrates a partial-perspective view of the locking device in the unlocked state.

When a vertical force is applied to the handle 122, such as when the user pulls on the handle 122, the transverse member 124 rotates with respect to the bushing 128 (FIG. 2) and the mounting bracket 140 so that the handle 122 moves upward and the actuation lever 126 rotates in a downward direction to depress the locking lever 134 to change the state of the locking device 132 from the locked state to the unlocked state (FIG. 11).

In one or more embodiments, the release assembly 120 may include one or more springs 142 configured to bias portions of the actuation assembly 118, such as the actuation levers 126, to hold the actuation assembly 118 in place when a force is not applied to the handle 122. The springs 142 may bias the actuation levers 126 against the locking levers 134 to maintain the position of the actuation assembly 118 and prevent the release levers 126 from bouncing against the locking levers 134 to avoid objectionable noise that may be generated from inadvertent movement of the actuation assembly 118.

Figure 4:
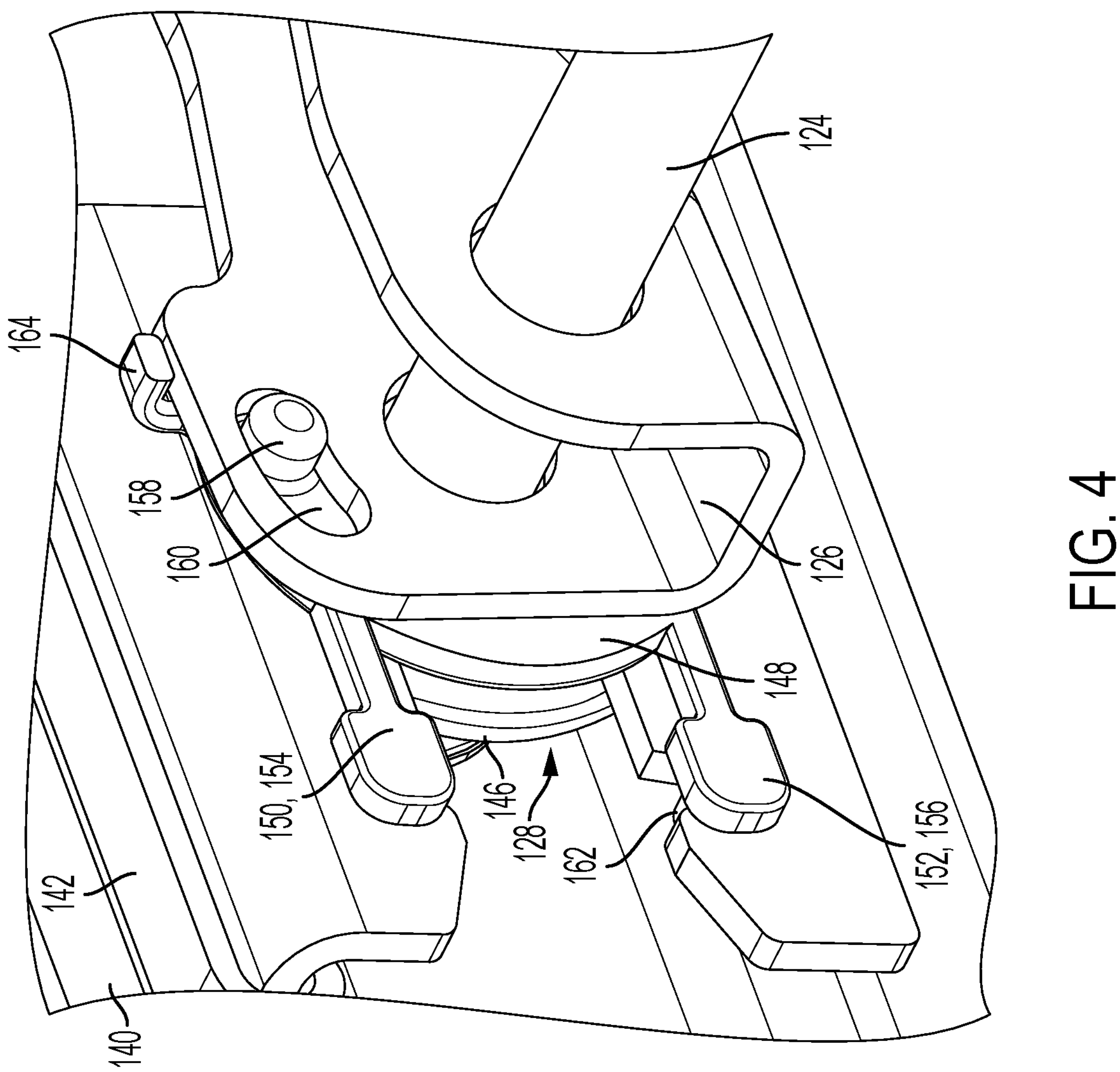
FIG. 4 illustrates a partial perspective view of a portion of a release assembly of the vehicle seat shown in FIG. 1.
Figure 5:
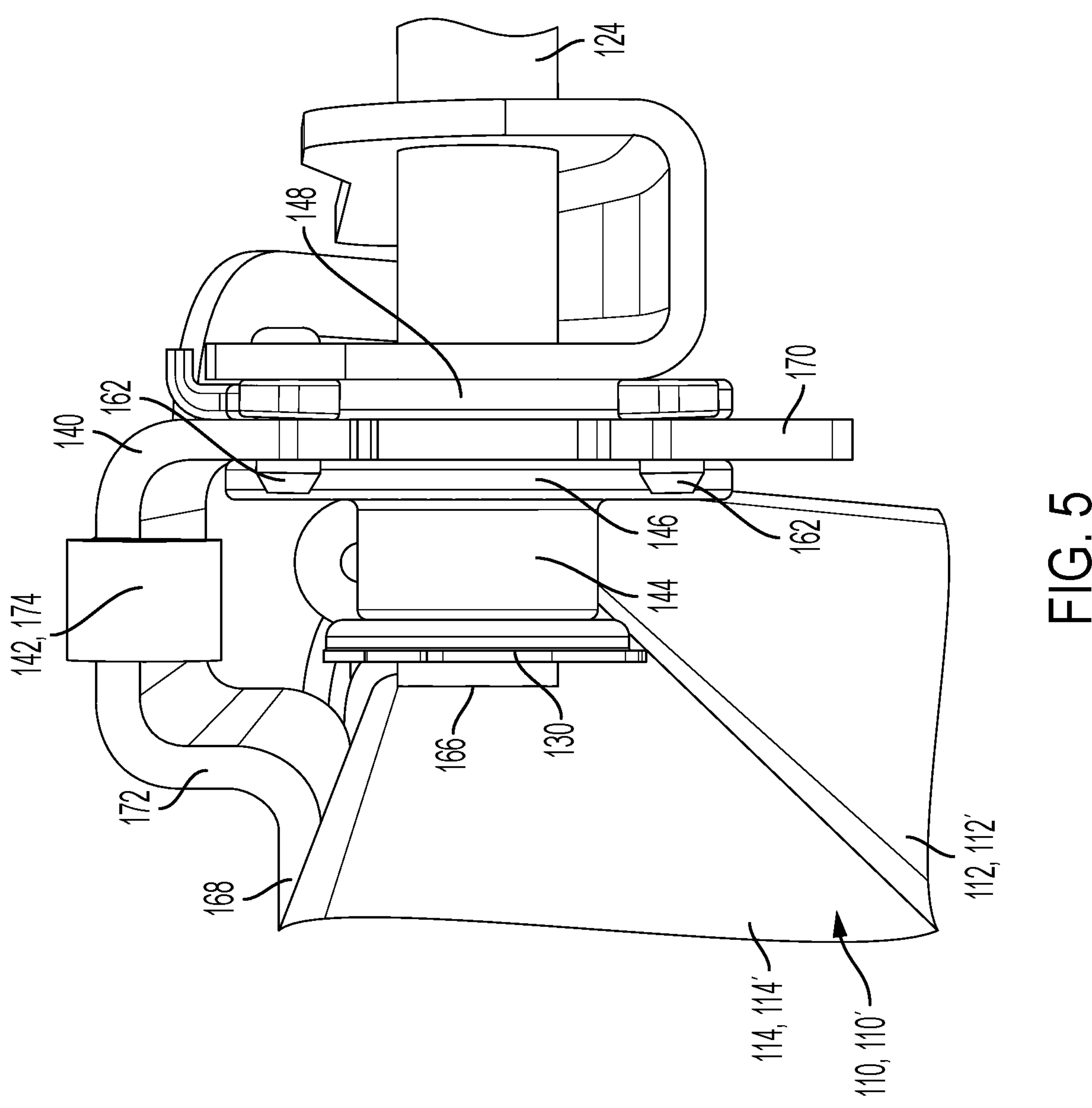
FIG. 5 illustrates a rear plan view of a portion of the release assembly.
Figure 6B:
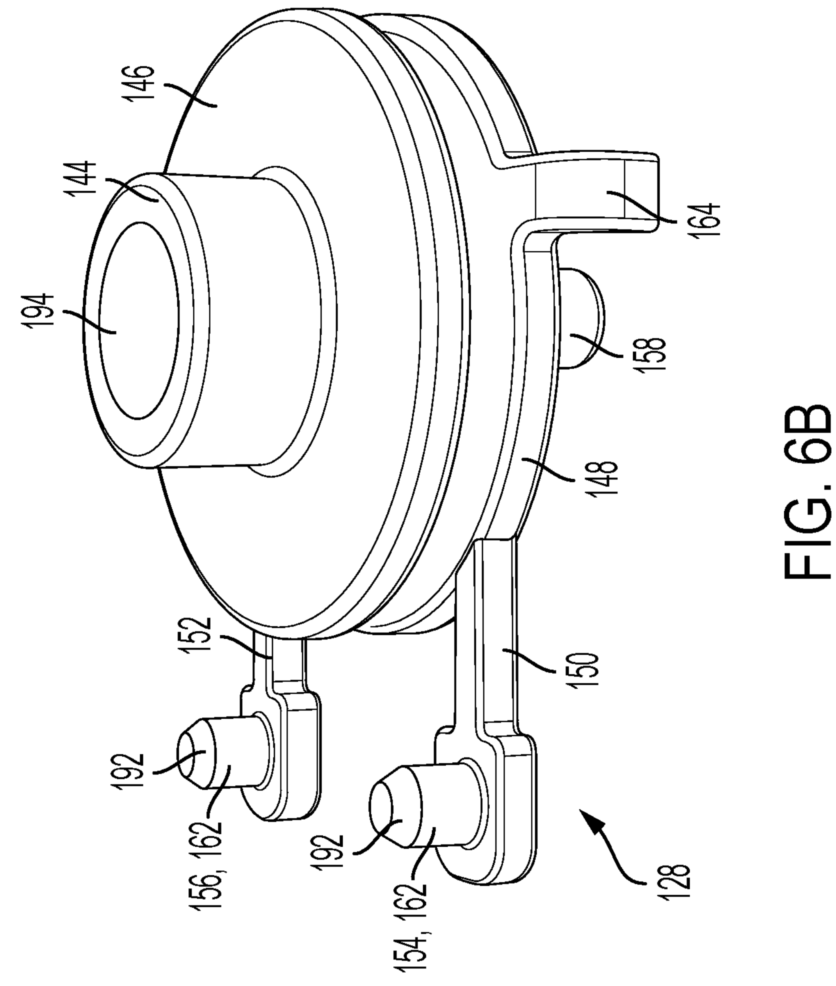
FIG. 6B illustrates a perspective view of the bushing illustrated in FIG. 6A.
Figure 6A:
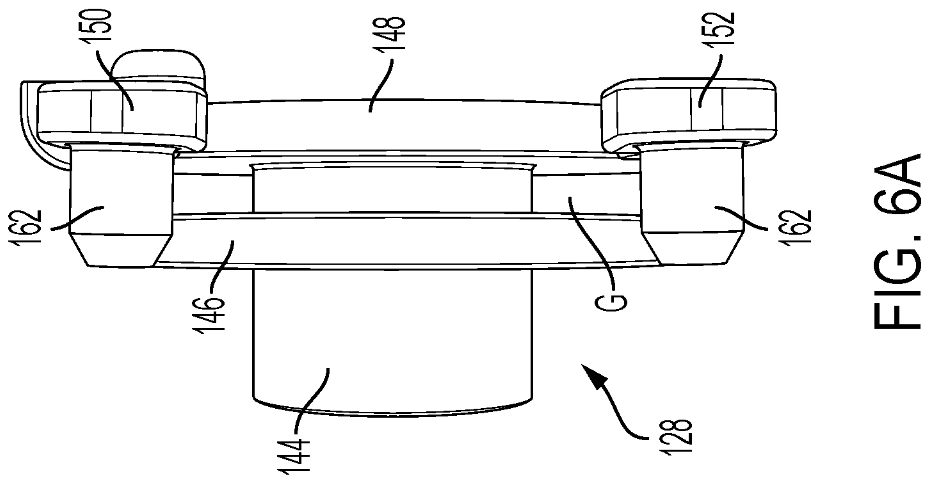
FIG. 6A illustrates a front plan view of an exemplary bushing.
Figure 6C:
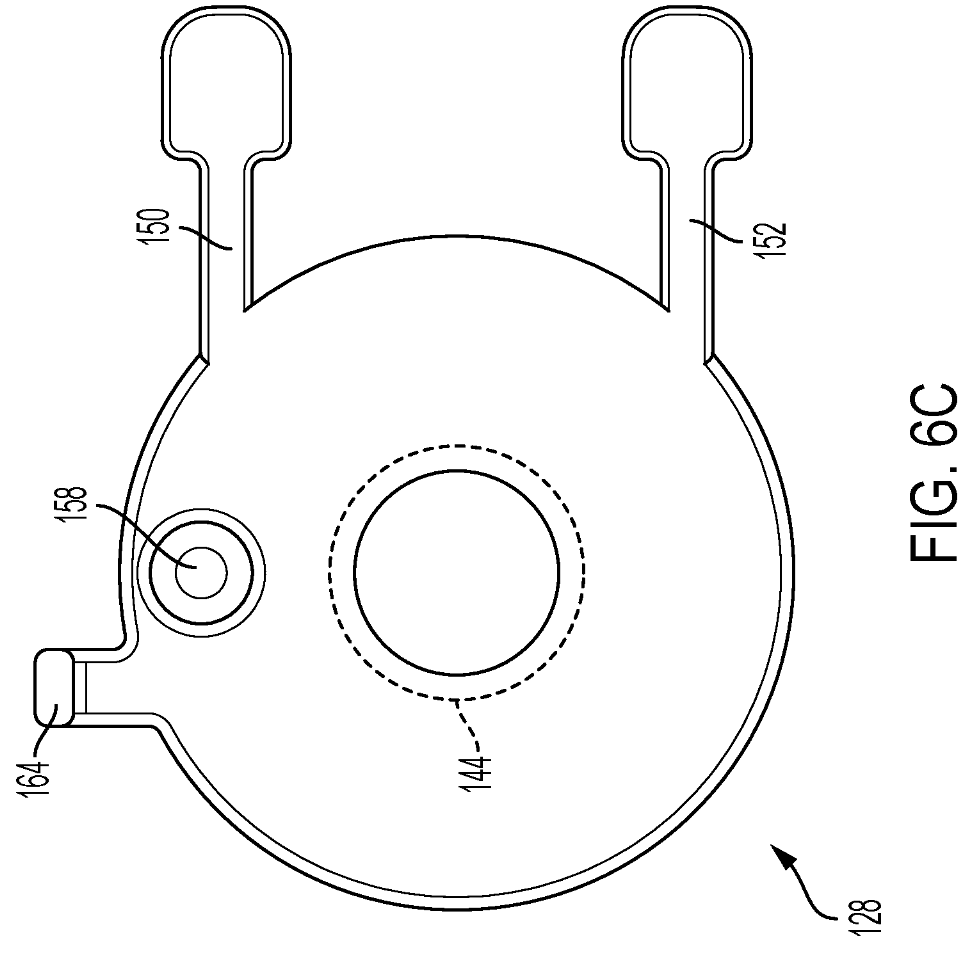
FIG. 6C illustrates a side plan view of the bushing illustrated in FIGS. 6A and 6B.

FIG. 4 illustrates a front-perspective view and FIG. 5 illustrates a rear plan view of a portion of the release assembly 120. FIGS. 6A-6C illustrate a front, perspective and side view of the bushing 128 according to one or more embodiments. As will be described in greater detail below, the bushing 128 and the mounting bracket 140 may be collectively configured to facilitate assembling the actuation assembly 118 to portions of the rail assembly 110, 110' such as the translatable rails 114, 114'.

In one or more embodiments, the mounting bracket 140 may include a first portion 168, a second portion 170, and a medial portion 172 extending there between. The first portion 168 may be fixed to the top surface, or another suitable surface, of the translatable rail 114, 114'. As an example, the first portion 168 may be fixed to the translatable rail 114, 114' by one or more welds formed by laser welding, MIG welding, or another suitable welding method. Alternatively or additionally, the first portion 168 of the mounting bracket 140 may be riveted to the top surface of the translatable rail 114, 114'. The second portion 170 of the mounting bracket 140 may be disposed between the left-hand rail assembly 110 and the right-hand rail assembly 110' and may extend in a vertical direction that is substantially orthogonal to the first portion 168 of the mounting bracket 140.

The second portion 170 of the mounting bracket 140 may define a slot such as an open-ended slot 178 that may be configured to receive the bushing 128 (e.g., the barrel 144 of the bushing 128) and an end portion 166 of the transverse member 124. The retaining clip 130 may be fixed to the distal end or end portion 166 of the transverse member 124 to maintain the axial position of the bushing 128 with respect to the transverse member 124. The spring 142 may include a free end 176 (FIG. 10) and a fixed end 174 that may be fixed to the medial portion of the mounting bracket 140 by one or more rivets or another suitable attachment method as required. As an example, the fixed end 174 of the spring 142 may be bent around portions of the mounting bracket 140 so that the spring 142 exerts a force sufficient to maintain the position of the actuation lever 126.

The bushing 128 may include the barrel 144, a first flange 146, and a second flange 148. The barrel 144 may extend from the second flange 148 to and beyond the first flange 146 and an inner periphery of the barrel 144 forms a receptacle 194 that may be sized to receive the end portion 166 of the transverse member 124 so that the transverse member 124 may rotate within the barrel 144 of the bushing as the actuation assembly 118 is actuated. The first flange 146 and the second flange 148 may be spaced apart to form a gap G that receives the second portion 170 of the mounting bracket 140. The second flange 148 may be configured to lie along portions of the actuation lever 126 and one side of the second portion 170 of the mounting bracket 140 so that the second flange 148 is sandwiched between the actuation lever 126 and the mounting bracket 140.

A sidewall of the actuation lever 126 may define an aperture 160 that may receive a protrusion such as a guide member 158 that extends from the second flange 148. As an example, the aperture 160 may have a non-circular shape, such as an arcuate slot, so that as the transverse member 124 rotates and the actuation lever 126 pivots, the bushing 128 is held stationary and the aperture 160 moves with respect to the protrusion 158. A retention flange 164 may extend from a top portion of the second flange 148 and curl over a top portion of the actuation lever 126. When the release assembly 120 is not actuated and when the locking device 132 is in the closed state, the retention flange 164 may be spaced apart from the top portion of the actuation lever, and when the release assembly 120 is actuated, the top portion of the actuation lever 126 may engage the retention flange 164 and act as a stop for the actuation lever 126.

The bushing 128 may further include one or more arms such as a first arm 150 and a second arm 152 that may each extend from the second flange 148. One or more of the arms 150, 152 may include protrusions such as locking protrusions 162 that may engage one or more retention features 186 (FIG. 7) defined by the mounting bracket 140 to fix the bushing 128 to the mounting bracket 140. As an example, one or more of the locking protrusions 162 may include tapered end to facilitate insertion of the locking protrusion 162 into the one or more retention features 186 (FIG. 7).

Figure 7:
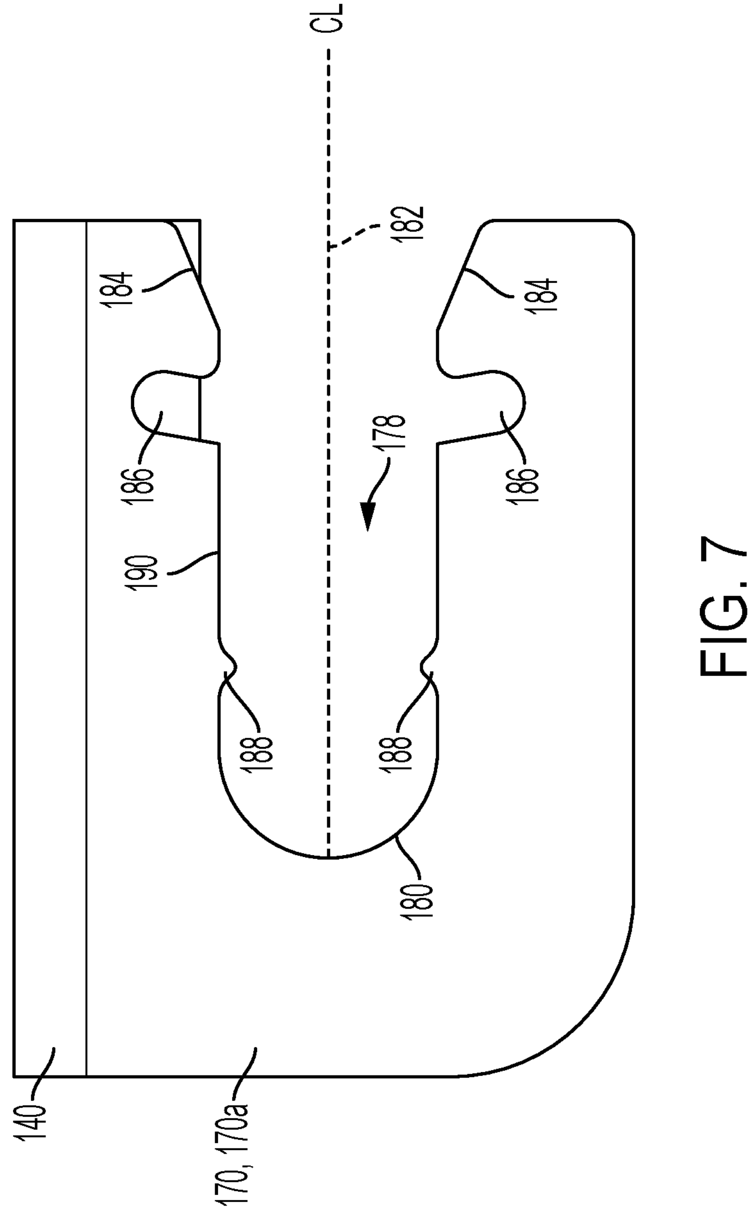
FIG. 7 illustrates a side plan view of a portion of an exemplary mounting bracket.

FIG. 7 illustrates a side plan view of the mounting bracket 140. FIG. 8A through FIG. 8F illustrate installation of the bushing 128 into the mounting bracket as viewed from each side 170*a*, 170*b* of the second portion 170 of the mounting bracket 140. The second portion 170 of the mounting bracket may include a first side 170*a* and a second side 170*b* that opposes the first side 170*a*. The first side 170*a* may be disposed closer to the actuation lever 126 than the second side 170*b*. For the purpose of clarity, only the bushing 128 and the mounting bracket 140 are illustrated, and the rail assemblies 110, 110', transverse member 124, actuation lever 126, spring 142, and clip 130 are not depicted.

Figures 8A, 8B, 8C, 8D, 8E, 8F:
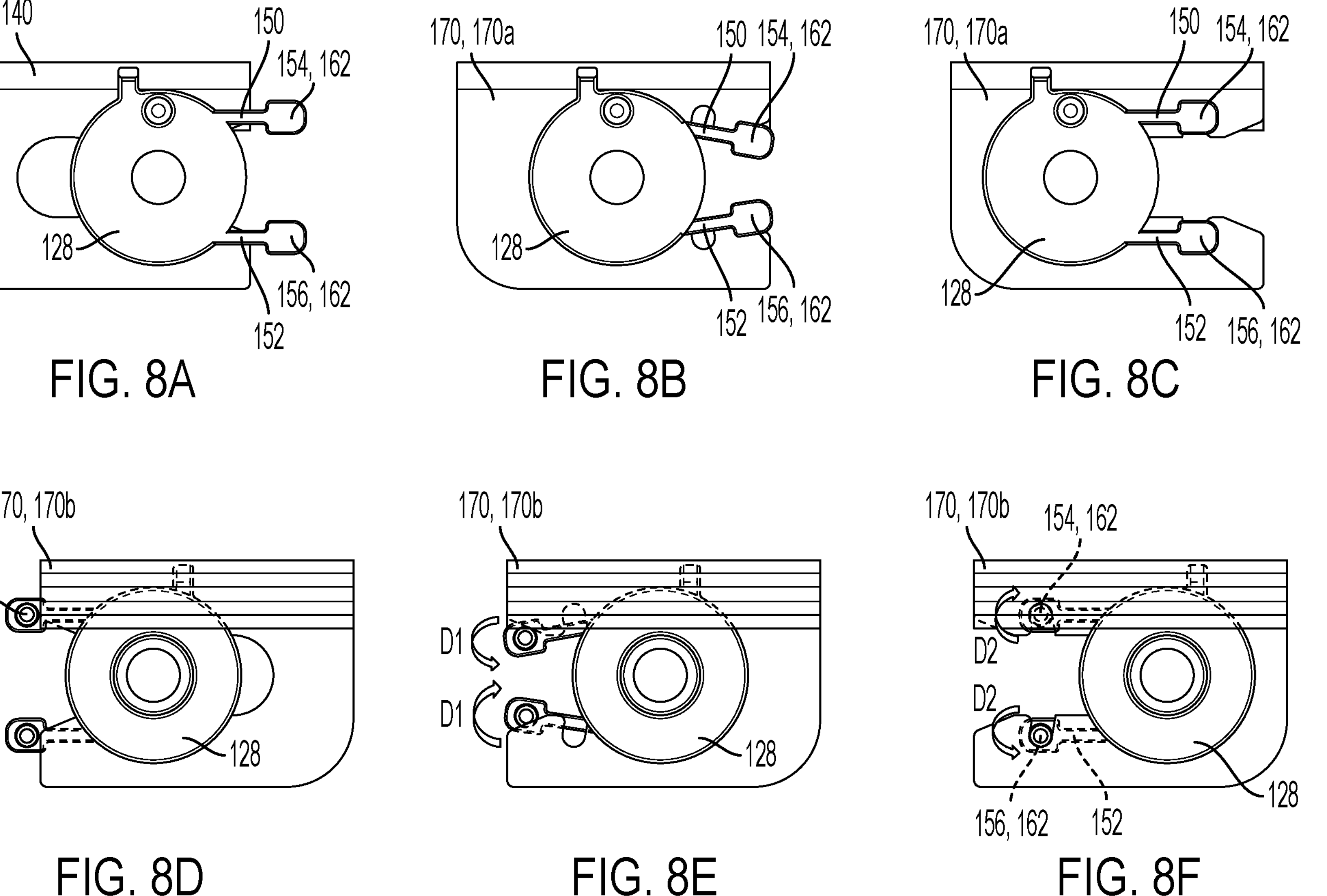
FIGS. 8A-8F illustrate side views of the bushing being assembled to the mounting bracket.

As an example, FIG. 8A and FIG. 8B show the bushing 128 being inserted into the slot prior to the distal end portions 154, 156 contacting one or more chamfers 184 of the mounting bracket 140 when viewing the first side 170A and the second side 170B of the mounting bracket 140, respectively. As an example, the chamfers 184 may extend towards the center CL of the slot 178 in a direction oblique to the longitudinal direction. FIGS. 8C and 8D show the bushing 128 being inserted into the slot as the distal end portions 154, 156 are deflected by the chamfers 184 of the mounting bracket 140 when viewing the first side 170A and the second side 170B of the mounting bracket 140, respectively. FIGS. 8E and 8F show the bushing 128 disposed in the installed position within the slot 178, in which the distal end portions 154, 156 (e.g., the locking protrusions 162) are disposed in the retention features 186 of the mounting bracket 140 when viewing the first side 170A and the second side 170B of the mounting bracket 140, respectively.

The second portion 170 of the mounting bracket 140 may define an open-ended slot 178 that includes a closed end 180 and an open end 182. An inner periphery 190 of the slot 178 may include one or more chamfers 184 that are configured to engage distal end portions 154, 156 of the first arm 150 and the second arm 152, respectively. As the chamfers 184 engage the distal end portions 154, 156 of the first arm 150 and the second arm 152, the first and second arms 150, 152 may bend towards a center CL of the slot 178 as represented by the directional arrows D1 in FIG. 8D.

The inner periphery 190 may further include one or more retention features to retain or fix the bushing 128 within the slot 178 of the mounting bracket 140. As an example, the retention features may include the apertures 186 or receptacles that receive the locking protrusions 162. After the bushing 128 has been inserted into the slot 178 by a predetermined distance, the arms 150, 152 may be configured to spring back, as represented by the directional arrows D2 in FIG. 8F. so that the locking protrusions are inserted into the apertures 186. Alternatively or additionally, the one or more retention features may include one or more protrusions 188 that are configured to trap portions of the bushing 128 (e.g., the barrel 144) between the closed end 180 and a side of the protrusions 188 disposed nearest the closed end 180. To facilitate insertion of the bushing 128 until the bushing lies along the closed end 180, the protrusions 188 may have a substantially triangular shape, but other suitable shapes are readily contemplated. The protrusions 188 may facilitate a snap-fit or form-fit condition between the barrel 144 of the bushing 128 and the second portion 170 of the mounting bracket 140. And, as an example, the snap-fit condition may produce an audible noise or haptic feeling that may indicate to an operator or a machine that the bushing 128 reaches the installed position.

Figure 9:
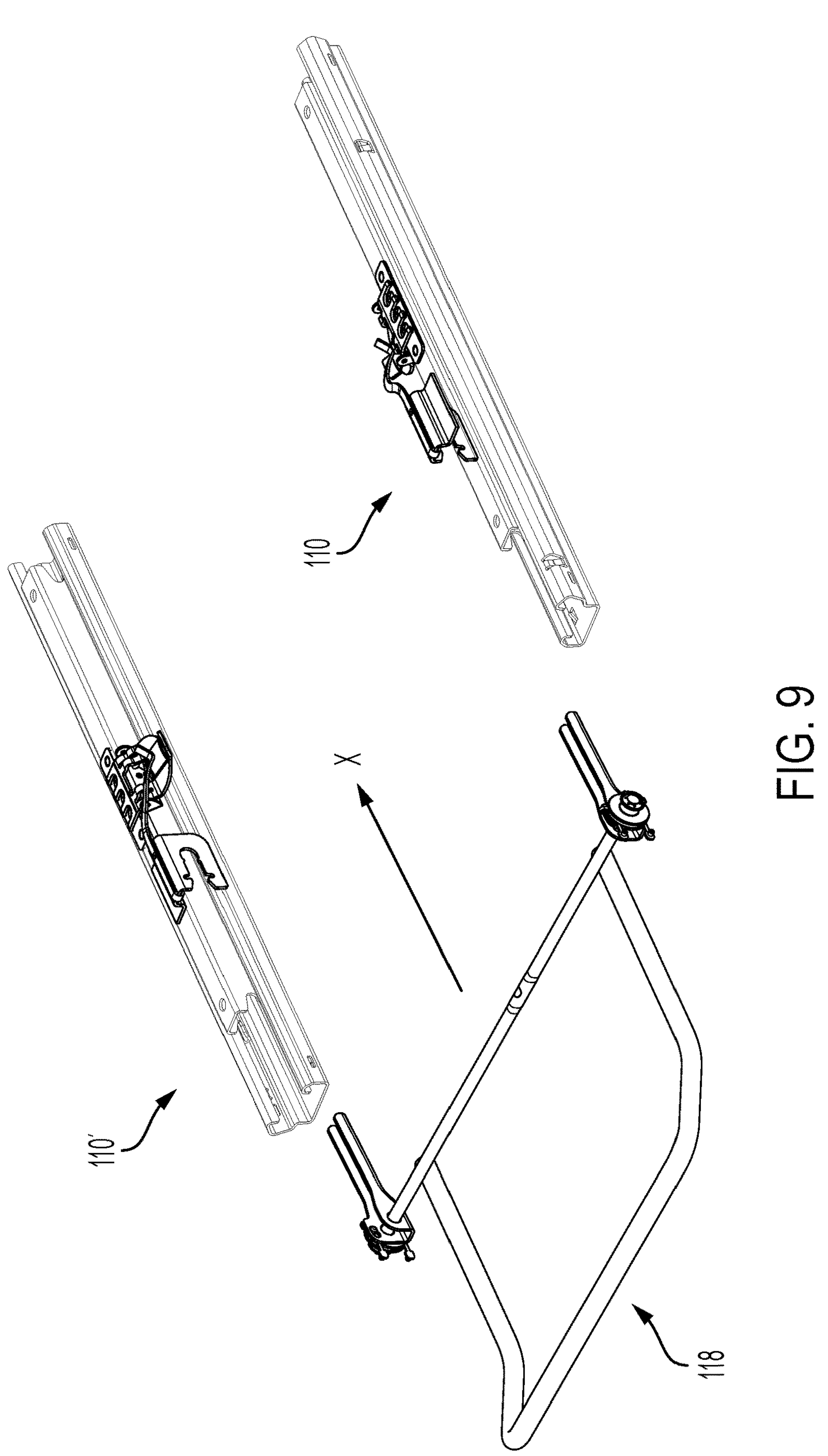
FIG. 9 illustrates a perspective view of the actuation assembly being assembled to the vehicle seat.
Figure 10:
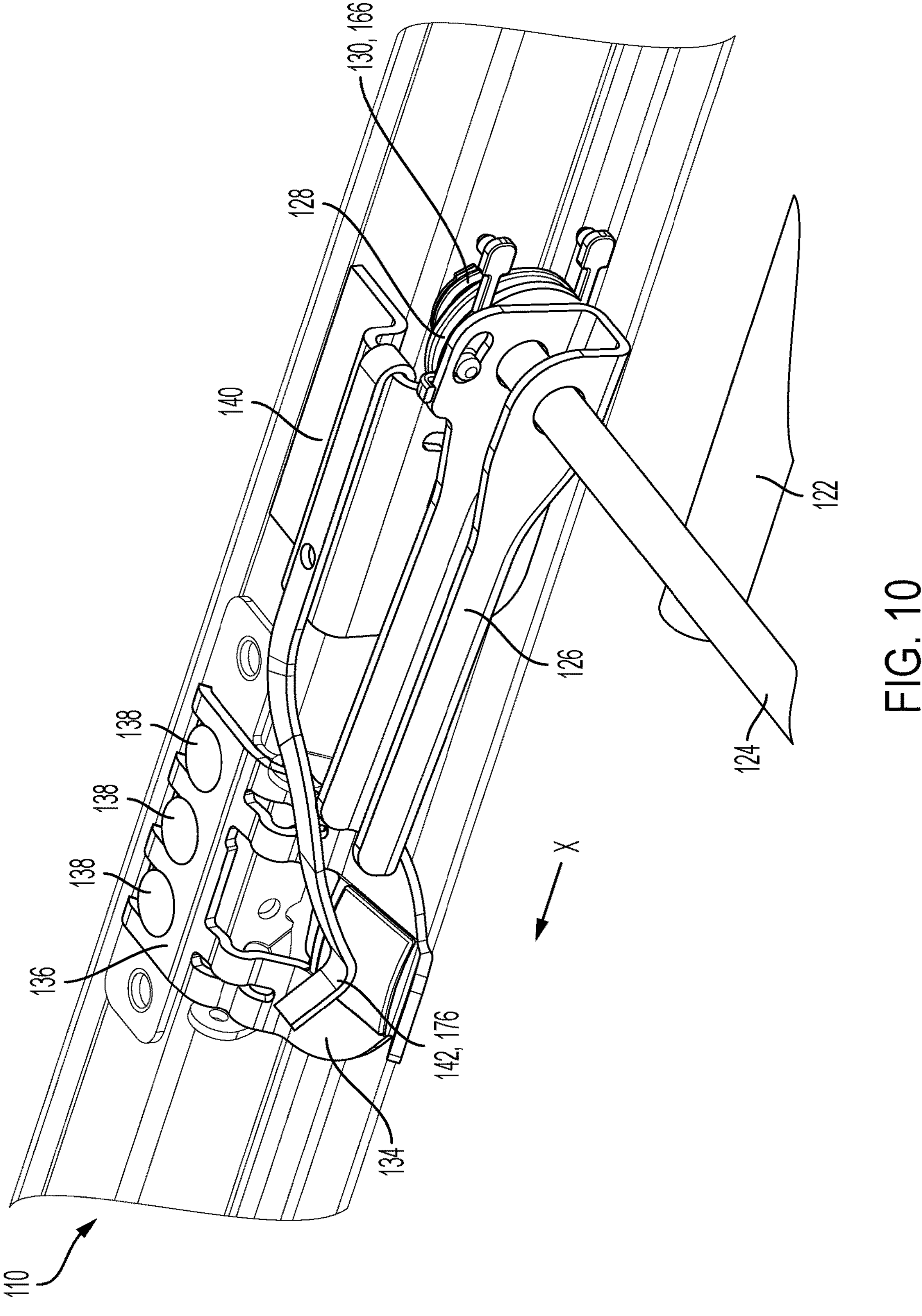
FIG. 10 illustrates a partial-perspective view of the actuation assembly being assembled to the vehicle seat.

FIG. 9 illustrates a perspective view of the actuation assembly 118 and the rail assemblies 110, 110' prior to inserting the actuation assembly 118 between each of the rail assemblies 110, 110'. FIG. 10 illustrates a perspective view of the actuation assembly 118 and the rail assembly 110 prior to inserting the bushing 128 into the slot 178 defined by the mounting bracket 140. As mentioned above, the actuation assembly 118 may include the transverse member 124 that is attached to the handle 122 and the actuation lever 126. The bushing 128 and the clip 130 may be fixed to the end portion 166 of the transverse member 124 so that the transverse member 124 is rotationally coupled to a portion the bushing 128 (e.g., the barrel 144). As the actuation assembly 118 is inserted along the x-direction (e.g., the longitudinal direction), as represented by the directional arrow X, an end portion of the actuation lever 126 may be disposed between the free end 176 of the spring 142.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

100 vehicle seat
102 cushion portion
104 back rest
106 seat cushion
108 recliner
110 rail assemblies
112 fixed rail
114 translatable rail
116 vehicle floor
118 actuation assembly 120 release assembly
122 handle
124 transverse member
126 actuation lever
128 bushing
130 retaining clip
132 locking/unlocking device
134 locking lever
136 pin lever
138 pins
140 mounting bracket
142 spring
144 barrel
146 first flange
148 second flange
150 first arm
152 second arm
154 distal end first arm
156 distal end second arm
158 guide member, protrusion
160 aperture, actuation lever
162 locking protrusion
164 retention flange
166 end portion of transverse member
168 first portion mounting bracket
170 second portion mounting bracket
172 medial portion mounting bracket
174 fixed end of spring
176 free end of spring
178 slot mounting bracket
180 closed end of slot
182 open end of slot
184 chamfer
186 retention feature aperture
188 retention feature protrusion
190 inner periphery slot
192 tapered end of locking protrusion
194 receptacle

What is claimed is:

1. A vehicle seat comprising:

a first rail assembly including a first fixed rail and a first translatable rail;

a second rail assembly including a second fixed rail and a second translatable rail;

at least one locking device coupled to at least one of the first rail assembly and the second rail assembly, wherein the at least one locking device includes a locking lever and the at least one locking device is configured to selectively change between a locked state, in which the at least one locking device locks at least one of the first translatable rail and the second translatable rail to the first fixed rail and the second fixed rail, respectively, and an unlocked state in which the at least one locking device permits one of the first translatable rail and the second translatable rail to translate in a longitudinal direction along the one of the first fixed rail and the second fixed rail, respectively;

an actuation assembly configured to rotate to actuate the locking lever to change the at least one locking device from the locked state to the unlocked state, wherein the actuation assembly is further configured to be fixed to the first and second rail assemblies by inserting the actuation assembly in a direction substantially parallel to the longitudinal direction and between the first rail assembly and the second rail assembly, and a mounting bracket fixed to at least one of the first fixed rail and the first translatable rail, wherein a first portion of the mounting bracket is disposed between the first and second rail assemblies and defines a slot provided with an open end, wherein the actuation assembly includes a handle, an actuation lever and a transverse member fixed to the handle and the actuation lever, wherein an end portion of the transverse member is configured to be inserted in the first direction into the slot and rotationally coupled to the first portion so that as a user applies a force to the handle, the transverse member rotates and the actuation lever moves to the locking lever to change the at least one locking device from the locked state to the unlocked state.

2. The vehicle seat of claim 1, further comprising:

a spring including a fixed end and a free end, the free end configured to sandwich the actuation lever to the locking lever of the at least one unlocking device, wherein the mounting bracket includes a second portion arranged substantially orthogonal to the first portion, and wherein the fixed end of the spring is fixed to the second portion of the mounting bracket.

3. The vehicle seat of claim 2, wherein the fixed end of the spring is bent around at least a portion of the second portion of the mounting bracket.

4. The vehicle seat of claim 1, further comprising:

a spring including a fixed end and a free end, wherein the actuation assembly includes a transverse member and an actuation lever fixed to the transverse member, wherein the fixed end of the spring is fixed to the mounting bracket, and wherein as the actuation assembly is inserted in the first direction and between the first and second rail assemblies, the transverse member of the actuation assembly is inserted into the open end of the slot and the actuation lever is inserted between the free end of the spring and the locking lever of the at least one unlocking device.

5. The vehicle seat of claim 1, further comprising:

a bushing including a barrel defining a receptacle configured to receive an end portion of the transverse member, wherein the slot is configured to receive the barrel and an inner periphery of the slot includes one or more retention members configured to retain the barrel within the slot, wherein the transverse member is configured to rotate to move the actuation lever so that the actuation lex er actuates the locking lever to change the at least one locking device from the locked state to the unlocked state.

6. The vehicle seat of claim 5, wherein the bushing further includes a first flange and a second flange, the first and second flanges radially extending from the barrel and spaced apart from one another to form a gap, wherein the gap is configured to receive portions of the mounting bracket.

7. The vehicle seat of claim 6, wherein the first flange is sandwiched between portions of the actuation lever and the mounting bracket.

8. The vehicle seat of claim 7, further comprising:

a retention ring disposed on the end portion of the transverse member, wherein the transverse member is configured to rotate about a rotational axis with respect to the mounting bracket and the retention ring is configured to fix the bushing to mitigate movement of the bushing along the rotational axis.

9. A release assembly for use in a vehicle seat, the vehicle seat including a pair of rail assemblies, wherein each rail assembly of the pair of rail assemblies includes a fixed rail, a translatable rail, and a locking device, the locking device configured to selectively lock the translatable rail to the fixed rail and unlock the translatable rail from the fixed rail to permit translation of the translatable rail along the fixed rail, the release assembly comprising:

a mounting bracket configured to be fixed to a rail assembly of the pair of rail assemblies, the mounting bracket including one or more retention features and defining a mounting aperture;

an actuation assembly, wherein in an installed state, the actuation assembly is configured to rotate relative to the mounting bracket to actuate a locking lever of the locking device to unlock the translatable rail; and a bushing fixed to the actuation assembly and configured to be inserted into the mounting aperture and, in the installed state, retained within the mounting aperture by a snap-fit condition formed between the bushing and the one or more retention features.

10. The release assembly of claim 9, wherein the actuation assembly includes a handle, an actuation lever, and a transverse member fixed to the handle and the actuation lever, wherein the bushing includes a barrel and a first spring arm, wherein the barrel is configured to receive a portion of the transverse member and the mounting aperture is configured to receive the barrel and a first retain the barrel, and wherein the one or more retention features of the mounting bracket includes a first receptacle configured to receive at least a portion of the first spring arm.

11. The release assembly of claim 9, wherein the actuation assembly includes a handle, an actuation lever, and a transverse member fixed to the handle and the actuation lever, wherein the bushing includes a barrel, a first spring arm, and a second spring arm, the barrel receives the transverse member wherein the one or more retention features of the mounting bracket includes a first receptacle and a second receptacle, wherein the mounting aperture is an open-ended slot including an open end and a closed end, wherein as the bushing is inserted into the open-ended slot, at least one of the first spring arm and the second spring arm deflects towards the barrel, and in response to the bushing and transverse member reaching an installed position, the at least one of the first spring arm and the second spring arm spring back so that the first spring arm is received by the first receptacle and the second spring arm is received by the second receptacle.

12. The release assembly of claim 11, wherein an inner periphery of the open end of the slot includes at least one chamfer, the at least one chamfer extending in a direction oblique to the insertion direction.

13. The release assembly of claim 11, wherein the bushing includes a flange and a guide member, the flange radially extending from the barrel and the guide member extending from the flange, wherein the actuation lever defines a guide configured to receive the guide member.

14. The release assembly of claim 13, wherein the guide is formed by an arcuate slot so that as the actuation assembly rotates, the transverse member rotates within the barrel and the actuation lever moves with respect to the guide member.

15. A method of assembling a release assembly for use in a vehicle seat, the vehicle seat including a pair of rail assemblies, wherein each rail assembly of the pair of rail assemblies includes a fixed rail, a translatable rail, and a locking device, the locking device configured to selectively lock the translatable rail to the fixed rail and unlock the translatable rail from the fixed rail to permit translation of the translatable rail along the fixed rail in a longitudinal direction, the method comprising:

fixing a bushing to an actuation assembly, wherein the actuation assembly includes a handle, an actuation lever, and a transverse member, the transverse member fixed to the handle and the actuation lever, wherein the bushing includes a barrel, wherein the fixing step includes inserting an end portion of the transverse member into the barrel of the bushing;

inserting the actuation assembly and bushing between each rail assembly of the pair of rail assemblies and in a direction substantially parallel to the longitudinal direction; and attaching the bushing to a mounting bracket, wherein the mounting bracket includes a first portion and a second portion, wherein the first portion of the mounting bracket is fixed to the translatable rail and the second portion is disposed between each rail assembly of the pair of rail assemblies.

16. The method of claim 15, wherein the mounting bracket defines an open-ended slot including an open end and a closed end, wherein an inner periphery of the slot defines one or more retention features, wherein the attaching step includes inserting the barrel of the bushing into the slot so that the barrel of the bushing is fixed between the closed end of the slot and the one or more retention features.

17. The method of claim 15, wherein the mounting bracket defines an open-ended slot including an open end and a closed end, wherein an inner periphery of the slot defines one or more retention features, wherein the bushing further includes a flange and at least one spring arm, wherein the flange radially extends from the barrel and the at least one spring arm extends from the flange, wherein the inserting step includes bending of the at least one spring arm towards a center of the slot.

18. The method of claim 17, wherein the attaching step includes the at least one spring arm springs back away from the center of the slot and engages the one or more retention features.

19. The method of claim 15, wherein the actuation lever defines an aperture, wherein the bushing further includes a flange and a protrusion, wherein the flange radially extends from the barrel and wherein the protrusion extends from the flange in a direction substantially orthogonal to the longitudinal direction, and wherein the fixing step includes inserting the protrusion into the aperture defined by the actuation lever.

* * * * *